US00RE45347E

(19) United States
(12) Reissued Patent
Chun et al.

(10) Patent Number: US RE45,347 E
(45) Date of Reissued Patent: Jan. 20, 2015

(54) METHODS OF TRANSMITTING DATA BLOCKS IN WIRELESS COMMUNICATION SYSTEM

(71) Applicant: LG Electronics Inc., Seoul (KR)

(72) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

(21) Appl. No.: 14/137,548

(22) Filed: Dec. 20, 2013

Related U.S. Patent Documents

Reissue of:

(64) Patent No.: 8,081,662
Issued: Dec. 20, 2011
Appl. No.: 12/451,185
PCT Filed: Apr. 30, 2008
PCT No.: PCT/KR2008/002468
§ 371 (c)(1),
(2), (4) Date: Oct. 29, 2009
PCT Pub. No.: WO2008/133484
PCT Pub. Date: Nov. 6, 2008

U.S. Applications:

(60) Provisional application No. 60/915,042, filed on Apr. 30, 2007, provisional application No. 60/915,417, filed on May 1, 2007.

(30) Foreign Application Priority Data

Apr. 30, 2008 (KR) ..... 10-2008-0040506

(51) Int. Cl.
*H04J 3/24* (2006.01)

(52) U.S. Cl.
USPC ..... 370/474; 370/252

(58) Field of Classification Search
USPC ..... 370/252–253, 389–427, 471–473, 370/474–477
See application file for complete search history.

(56) References Cited

U.S. PATENT DOCUMENTS 4,205,200 A 5/1980 Parikh et al.
5,588,009 A 12/1996 Will (Continued)

FOREIGN PATENT DOCUMENTS

CN 1549612 11/2004
CN 1719932 1/2006

(Continued)

OTHER PUBLICATIONS

3GPP TSG-RAN WG2 #57, R2-070778, Contention-based and Contention-free Access Procedures in LTE, NTT DoCoMo, Inc., Feb. 12-16, 2007.

(Continued)

*Primary Examiner* — Ricky Ngo
*Assistant Examiner* — Iqbal Zaidi
(74) *Attorney, Agent, or Firm* — McKenna Long & Aldridge LLP

(57) ABSTRACT

Disclosed is a method for generating a data block to be transmitted from a specific layer in a transmitting side to a receiving side in a wireless communication system. The method includes receiving an upper layer datei block from an upper layer and generating a lower layer data block including at least part of the upper layer data block and state indication information indicating a state of the upper layer data block, the state indication information being selected variably according to a logical channel through which the upper layer data block is received. This method optimizes overhead of a header of each upper layer data block according to contents of the upper layer data block and event situations associated with the upper layer data block, thereby increasing system efficiency.

4 Claims, 6 Drawing Sheets

(56) References Cited

U.S. PATENT DOCUMENTS 5,894,595 A 4/1999 Foladare et al.
6,157,833 A 12/2000 Lawson-Jenkins et al.
6,173,057 B1 1/2001 Truong et al.
6,233,430 B1 5/2001 Helferich
6,324,171 B1 11/2001 Lee et al.
6,353,628 B1 3/2002 Wallace et al.
6,526,027 B1 2/2003 Yeom
6,567,409 B1 5/2003 Tozaki et al.
6,725,267 B1 4/2004 Hoang
6,785,256 B2 8/2004 O'Neill
6,795,419 B2 9/2004 Parantainen et al.
7,039,425 B1 5/2006 Mazawa et al.
7,197,317 B2 3/2007 Parkvall et al.
7,245,707 B1 * 7/2007 Chan ..... 379/88.17
7,373,148 B2 5/2008 Kim et al.
7,443,813 B2 10/2008 Hwang et al.
7,457,588 B2 11/2008 Love et al.
7,525,908 B2 4/2009 Olsson et al.
7,551,643 B2 6/2009 Yeo et al.
7,606,370 B2 10/2009 Lillie et al.
7,680,058 B2 3/2010 Seurre et al.
7,769,351 B2 8/2010 Kwak et al.
7,801,527 B2 9/2010 Putcha
7,864,731 B2 1/2011 Forsberg
7,899,451 B2 3/2011 Hu et al.
7,912,471 B2 3/2011 Patabandi et al.
7,916,697 B2 3/2011 Eklund
7,958,542 B2 6/2011 Herrmann
8,064,676 B2 11/2011 Li et al.
8,427,997 B2 4/2013 Ren et al.
8,582,482 B2 11/2013 Hsu
8,582,487 B2 11/2013 Gou et al.
8,588,100 B2 11/2013 Wei
8,614,971 B2 12/2013 Kim et al.
2001/0012787 A1 8/2001 Wortham
2001/0017850 A1 8/2001 Kalliokulju et al.
2001/0034791 A1 10/2001 Clubb et al.
2001/0044322 A1 11/2001 Raaf
2002/0024972 A1 2/2002 Yi et al.
2002/0028690 A1 3/2002 McKenna et al.
2002/0057663 A1 5/2002 Lim
2002/0059464 A1 5/2002 Hata et al.
2002/0091860 A1 7/2002 Kalliokulju et al.
2002/0114294 A1 8/2002 Toskala et al.
2003/0007490 A1 1/2003 Yi et al.
2003/0007512 A1 1/2003 Tourunen et al.
2003/0016698 A1 1/2003 Chang et al.
2003/0050078 A1 3/2003 Motegi et al.
2003/0119488 A1 6/2003 Hans et al.
2003/0123485 A1 * 7/2003 Yi et al. ..... 370/477
2003/0125056 A1 7/2003 Jiang
2003/0139170 A1 7/2003 Heo
2003/0147371 A1 8/2003 Choi et al.
2003/0165122 A1 9/2003 Westphal
2003/0165133 A1 9/2003 Garani
2003/0165166 A1 9/2003 Funakawa
2003/0189922 A1 10/2003 Howe
2003/0207696 A1 11/2003 Willenegger et al.
2003/0223452 A1 12/2003 Toskala et al.
2003/0227875 A1 12/2003 Wei et al.
2004/0014452 A1 1/2004 Lim et al.
2004/0028078 A1 2/2004 Beckmann et al.
2004/0039830 A1 2/2004 Zhang et al.
2004/0042507 A1 3/2004 Pelletier et al.
2004/0087320 A1 5/2004 Kim et al.
2004/0100940 A1 5/2004 Kuure et al.
2004/0117860 A1 6/2004 Yi et al.
2004/0121771 A1 6/2004 Song et al.
2004/0147269 A1 7/2004 Kim
2004/0148427 A1 7/2004 Nakhjiri et al.
2004/0176112 A1 9/2004 Beckmann et al.
2004/0180675 A1 9/2004 Choi et al.
2004/0185837 A1 9/2004 Kim et al.
2004/0202107 A1 10/2004 Bensimon et al.
2004/0229605 A1 11/2004 Hwang et al.
2004/0233870 A1 11/2004 Willenegger
2004/0242195 A1 12/2004 Chun et al.
2004/0253959 A1 12/2004 Hwang et al.
2005/0009527 A1 1/2005 Sharma
2005/0018624 A1 1/2005 Meier et al.
2005/0032555 A1 2/2005 Jami et al.
2005/0037767 A1 2/2005 Kim et al.
2005/0041610 A1 2/2005 Lee et al.
2005/0041681 A1 2/2005 Lee et al.
2005/0053029 A1 3/2005 Lee et al.
2005/0063347 A1 3/2005 Sarkkinen et al.
2005/0070253 A1 3/2005 Farnsworth et al.
2005/0085254 A1 4/2005 Chuah et al.
2005/0094670 A1 5/2005 Kim
2005/0100048 A1 5/2005 Chun et al.
2005/0141462 A1 * 6/2005 Aerrabotu et al. ..... 370/335
2005/0141471 A1 6/2005 Virtanen et al.
2005/0141538 A1 6/2005 Beckmann et al.
2005/0151541 A1 7/2005 Brinz et al.
2005/0160184 A1 7/2005 Walsh et al.
2005/0164719 A1 7/2005 Waters
2005/0176430 A1 8/2005 Lee et al.
2005/0176474 A1 8/2005 Lee et al.
2005/0185620 A1 8/2005 Lee et al.
2005/0232271 A1 10/2005 Kettunen et al.
2005/0238051 A1 10/2005 Yi et al.
2005/0249188 A1 11/2005 Hayashi
2005/0265294 A1 12/2005 Hu et al.
2005/0286470 A1 12/2005 Asthana et al.
2005/0288022 A1 12/2005 Ryu et al.
2006/0013165 A1 1/2006 Choi et al.
2006/0034335 A1 2/2006 Karaoguz et al.
2006/0039309 A1 2/2006 Lee et al.
2006/0067324 A1 * 3/2006 Kim et al. ..... 370/395.2
2006/0067364 A1 * 3/2006 Jung et al. ..... 370/469
2006/0087994 A1 4/2006 Barth et al.
2006/0098567 A1 5/2006 Willenegger et al.
2006/0098688 A1 5/2006 Parkvall et al.
2006/0126554 A1 6/2006 Motegi et al.
2006/0126570 A1 6/2006 Kim et al.
2006/0142019 A1 6/2006 Kroth et al.
2006/0165045 A1 7/2006 Kim et al.
2006/0187846 A1 8/2006 Pelletier et al.
2006/0195540 A1 8/2006 Hamilton et al.
2006/0203760 A1 9/2006 Fukui et al.
2006/0209870 A1 9/2006 Lee et al.
2006/0218271 A1 9/2006 Kasslin et al.
2006/0245417 A1 11/2006 Conner et al.
2006/0251105 A1 11/2006 Kim et al.
2006/0262811 A1 11/2006 Jiang
2007/0041349 A1 2/2007 Kim et al.
2007/0041382 A1 2/2007 Vayanos et al.
2007/0047452 A1 3/2007 Lohr
2007/0047493 A1 3/2007 Park et al.
2007/0047582 A1 3/2007 Malkamaki
2007/0060139 A1 3/2007 Kim et al.
2007/0064631 A1 3/2007 Tseng et al.
2007/0064665 A1 3/2007 Zhang et al.
2007/0155389 A1 7/2007 Zhang
2007/0155390 A1 7/2007 Patabandi et al.
2007/0165567 A1 7/2007 Tan et al.
2007/0165635 A1 7/2007 Zhang et al.
2007/0177569 A1 8/2007 Lundby
2007/0178875 A1 8/2007 Rao et al.
2007/0206531 A1 9/2007 Pajukoski et al.
2007/0224993 A1 9/2007 Forsberg
2007/0248075 A1 10/2007 Liu et al.
2007/0254679 A1 11/2007 Montojo et al.
2007/0258591 A1 11/2007 Terry et al.
2007/0291634 A1 12/2007 Kwon et al.
2007/0291646 A1 12/2007 Ohishi et al.
2007/0291673 A1 12/2007 Demirhan et al.
2007/0291695 A1 12/2007 Sammour et al.
2007/0291719 A1 12/2007 Demirhan et al.
2007/0291728 A1 12/2007 Dalsgaard et al.
2007/0291729 A1 12/2007 Dalsgaard et al.
2007/0291788 A1 12/2007 Sammout et al.
2007/0293224 A1 12/2007 Wang et al.
2008/0004058 A1 1/2008 Jeong et al.

(56) References Cited

U.S. PATENT DOCUMENTS

| | | | |
|---|---|---|---|
| 2008/0009289 | A1 | 1/2008 | Kashima et al. |
| 2008/0043619 | A1 | 2/2008 | Sammour et al. |
| 2008/0056198 | A1 | 3/2008 | Charpentier et al. |
| 2008/0056273 | A1 | 3/2008 | Pelletier et al. |
| 2008/0064390 | A1 | 3/2008 | Kim |
| 2008/0076359 | A1 | 3/2008 | Charpentier et al. |
| 2008/0089285 | A1 | 4/2008 | Pirskanen et al. |
| 2008/0089292 | A1 | 4/2008 | Kitazoe et al. |
| 2008/0095185 | A1 | 4/2008 | DiGirolamo et al. |
| 2008/0101268 | A1 | 5/2008 | Sammour et al. |
| 2008/0167089 | A1 | 7/2008 | Suzuki et al. |
| 2008/0181127 | A1 | 7/2008 | Terry et al. |
| 2008/0182594 | A1 | 7/2008 | Flore et al. |
| 2008/0186946 | A1 | 8/2008 | Marinier et al. |
| 2008/0188223 | A1 | 8/2008 | Vesterinen et al. |
| 2008/0225744 | A1 | 9/2008 | DiGirolamo et al. |
| 2008/0225765 | A1 | 9/2008 | Marinier et al. |
| 2008/0240439 | A1 | 10/2008 | Mukherjee et al. |
| 2008/0259912 | A1 | 10/2008 | Wang et al. |
| 2008/0267126 | A1 | 10/2008 | Vujcic |
| 2008/0267405 | A1 | 10/2008 | Vialen et al. |
| 2008/0268850 | A1 | 10/2008 | Narasimha et al. |
| 2008/0273610 | A1 | 11/2008 | Malladi et al. |
| 2008/0280567 | A1 | 11/2008 | Sharma |
| 2008/0285691 | A1 | 11/2008 | Onggosanusi et al. |
| 2008/0287091 | A1 | 11/2008 | Suzuki et al. |
| 2008/0287129 | A1 | 11/2008 | Somasundaram et al. |
| 2008/0310452 | A1 | 12/2008 | Vedantham et al. |
| 2008/0316959 | A1 | 12/2008 | Bachl et al. |
| 2009/0005051 | A1 | 1/2009 | Voyer et al. |
| 2009/0022107 | A1 | 1/2009 | Kapoor et al. |
| 2009/0034466 | A1 | 2/2009 | Lindskog et al. |
| 2009/0040982 | A1 | 2/2009 | Ho et al. |
| 2009/0086659 | A1 | 4/2009 | Pani et al. |
| 2009/0086710 | A1 | 4/2009 | Ho |
| 2009/0092076 | A1 | 4/2009 | Zheng et al. |
| 2009/0109912 | A1 | 4/2009 | DiGirolamo et al. |
| 2009/0124259 | A1 | 5/2009 | Attar et al. |
| 2009/0143074 | A1 | 6/2009 | Pelletier et al. |
| 2009/0163199 | A1 | 6/2009 | Kazmi et al. |
| 2009/0175183 | A1 | 7/2009 | Mochizuki et al. |
| 2009/0181710 | A1 | 7/2009 | Pani et al. |
| 2009/0207771 | A1 | 8/2009 | Lindskog |
| 2009/0239538 | A1 | 9/2009 | Motegi et al. |
| 2009/0264164 | A1 | 10/2009 | Chun et al. |
| 2009/0318170 | A1 | 12/2009 | Lee et al. |
| 2010/0027413 | A1 | 2/2010 | Park et al. |
| 2010/0046384 | A1 | 2/2010 | Lee et al. |
| 2010/0061285 | A1 | 3/2010 | Maeda et al. |
| 2010/0061330 | A1 | 3/2010 | Hanov |
| 2010/0067495 | A1 | 3/2010 | Lee et al. |
| 2010/0075635 | A1 | 3/2010 | Lim et al. |
| 2010/0128669 | A1 | 5/2010 | Chun et al. |
| 2010/0137016 | A1 | 6/2010 | Voyer et al. |
| 2010/0165901 | A1 | 7/2010 | Kim |
| 2010/0195568 | A1 | 8/2010 | Imori |
| 2010/0227614 | A1 | 9/2010 | Chun et al. |
| 2010/0238799 | A1 | 9/2010 | Sebire |
| 2010/0238903 | A1 | 9/2010 | Kitazoe |
| 2010/0254340 | A1 | 10/2010 | Park et al. |
| 2010/0265896 | A1 | 10/2010 | Park et al. |
| 2010/0272004 | A1 | 10/2010 | Maeda et al. |
| 2010/0309877 | A1 | 12/2010 | Damnjanovic et al. |
| 2011/0039536 | A1 | 2/2011 | Lee et al. |
| 2011/0090836 | A1 | 4/2011 | Mochizuki et al. |
| 2011/0116436 | A1 | 5/2011 | Bachu et al. |
| 2011/0182243 | A1 | 7/2011 | Gallagher et al. |
| 2011/0207427 | A1 | 8/2011 | Kitani et al. |
| 2011/0261743 | A1 | 10/2011 | Futaki et al. |
| 2012/0002589 | A1 | 1/2012 | Saifullah et al. |

FOREIGN PATENT DOCUMENTS

| | | | |
|---|---|---|---|
| CN | 1751460 | | 3/2006 |
| CN | 1731887 | | 8/2006 |
| CN | 1835627 | | 9/2006 |
| EP | 0 889 664 | | 1/1999 |
| EP | 1 148 753 | | 10/2001 |
| EP | 1 168 877 | | 1/2002 |
| EP | 1 209 938 | | 5/2002 |
| EP | 1 304 898 | | 4/2003 |
| EP | 1315356 | | 5/2003 |
| EP | 1315356 | A2 * | 5/2003 |
| EP | 1 318 632 | | 6/2003 |
| EP | 1337124 | A2 | 8/2003 |
| EP | 1 372 310 | | 12/2003 |
| EP | 1 420 551 | | 5/2004 |
| EP | 1 501 328 | | 1/2005 |
| EP | 1499144 | | 1/2005 |
| EP | 1511245 | | 3/2005 |
| EP | 1 720 373 | | 11/2006 |
| EP | 1720322 | A1 | 11/2006 |
| EP | 1720373 | | 11/2006 |
| EP | 1932380 | | 6/2008 |
| EP | 2087653 | | 8/2009 |
| JP | 6-006294 | | 1/1994 |
| JP | 2002-539686 | | 11/2002 |
| JP | 2003-504935 | | 2/2003 |
| JP | 2003-087180 | | 3/2003 |
| JP | 2003-196775 | | 7/2003 |
| JP | 2003-235064 | | 8/2003 |
| JP | 2004-134904 | | 4/2004 |
| JP | 2005-39726 | | 2/2005 |
| JP | 2005-057787 | | 3/2005 |
| JP | 2005-260906 | A | 9/2005 |
| JP | 2005-318131 | A | 11/2005 |
| JP | 2005-354488 | | 12/2005 |
| JP | 2006-505979 | | 2/2006 |
| JP | 2006-067115 | | 3/2006 |
| JP | 2006-528456 | | 12/2006 |
| JP | 2007-165635 | | 6/2007 |
| JP | 2008-535370 | | 8/2008 |
| JP | 2008-539678 | | 11/2008 |
| JP | 2009-540721 | | 11/2009 |
| JP | 2009-542100 | | 11/2009 |
| KR | 10-2000-0039404 | A | 7/2000 |
| KR | 10-2001-0015234 | | 2/2001 |
| KR | 10-2001-0105240 | | 11/2001 |
| KR | 10-2002-0001173 | A | 1/2002 |
| KR | 10-2002-0014939 | A | 2/2002 |
| KR | 10-2003-0005537 | A | 1/2003 |
| KR | 10-2003-0026924 | | 4/2003 |
| KR | 10-2003-0080165 | A | 10/2003 |
| KR | 10-2003-0093604 | | 12/2003 |
| KR | 10-2004-0005834 | A | 1/2004 |
| KR | 10-2004-0039944 | | 5/2004 |
| KR | 10-2004-0048675 | | 6/2004 |
| KR | 10-2004-0072858 | A | 8/2004 |
| KR | 10-2004-0086950 | | 10/2004 |
| KR | 10-2005-0008440 | | 1/2005 |
| KR | 10-2005-0019560 | A | 3/2005 |
| KR | 10-2005-0027972 | | 3/2005 |
| KR | 10-2005-0053376 | A | 6/2005 |
| KR | 10-2005-0063174 | A | 6/2005 |
| KR | 10-2005-0073244 | A | 7/2005 |
| KR | 10-0595646 | A | 7/2005 |
| KR | 10-2005-0096763 | | 10/2005 |
| KR | 10-2005-0100552 | | 10/2005 |
| KR | 10-2005-0100552 | A | 10/2005 |
| KR | 10-2005-0100861 | A | 10/2005 |
| KR | 10-2005-0106845 | A | 11/2005 |
| KR | 10-2006-0024756 | | 3/2006 |
| KR | 10-2006-0024756 | A | 3/2006 |
| KR | 10-2006-0026722 | A | 3/2006 |
| KR | 10-2006-0048373 | A | 5/2006 |
| KR | 10-2006-0073472 | A | 6/2006 |
| KR | 10-2006-0091525 | A | 8/2006 |
| KR | 10-2007-0006850 | A | 1/2007 |
| KR | 10-2007-0047669 | A | 5/2007 |
| RU | 2249917 | C2 | 4/2005 |

(56) References Cited

FOREIGN PATENT DOCUMENTS

| | | | |
|---|---|---|---|
| WO | 9904584 | | 1/1999 |
| WO | 00/74416 | | 12/2000 |
| WO | 01/78252 | A1 | 10/2001 |
| WO | 02/39622 | | 5/2002 |
| WO | 02091659 | | 11/2002 |
| WO | 03100988 | | 12/2003 |
| WO | 2004017581 | | 2/2004 |
| WO | 2004/028050 | | 4/2004 |
| WO | 2004/043094 | | 5/2004 |
| WO | 2004064272 | | 7/2004 |
| WO | 2004091246 | | 10/2004 |
| WO | 2004102833 | | 11/2004 |
| WO | 2005/048613 | | 5/2005 |
| WO | 2005067262 | | 7/2005 |
| WO | 2005122616 | | 12/2005 |
| WO | 2006/000876 | | 1/2006 |
| WO | 2006/011763 | | 2/2006 |
| WO | 2006/018670 | | 2/2006 |
| WO | 2006049441 | A1 | 5/2006 |
| WO | 2006075820 | A1 | 7/2006 |
| WO | 2006/104344 | | 10/2006 |
| WO | 2006/108703 | A1 | 10/2006 |
| WO | 2006/109851 | | 10/2006 |
| WO | 2006/116620 | | 11/2006 |
| WO | 2007025138 | | 3/2007 |
| WO | 2007/052888 | | 5/2007 |
| WO | 2007/078155 | | 7/2007 |
| WO | 2007/078172 | | 7/2007 |
| WO | 2007078929 | A2 | 7/2007 |
| WO | 2007/133034 | | 11/2007 |
| WO | 2008/051466 | | 5/2008 |
| WO | 2008096984 | | 8/2008 |
| WO | 2008111684 | A1 | 9/2008 |
| WO | 2009084998 | | 7/2009 |

OTHER PUBLICATIONS

3GPP TSG-RAN WG2 #61, R2-080873, Timer handling for RACH procedures, Panasonic, Feb. 11-15, 2008.

3GPP TSG-RAN WG2 #59, R2-073186, RACH access optimisation, IPWireless, NextWave Wireless, Jun. 20-24, 2007.

LG Electronics, Inc., "Scheduling Consideration on L2 Header", 3GPP TSG-RAN WG2 #58, R2-071887, Kobe, Japan, May 2007.

Nokia: "Active Mode DRX", 3GPP TSG-RAN WG2 Meeting #55, Seoul, Korea, Oct. 9-11, 2006, R2-062752.

NTT DoCoMo, Inc.: "Views on DRX/DTX control in LTE", 3GPP TSG RAN WG2 #56, Riga, Lativa, Nov. 6-10, 2006, R2-063397.

Email Rapporteur (Nokia): "DRX in E-UTRAN", 3GPP TSG-RAN WG2 Meeting #57, St. Louis, Missouri, Feb. 12-16, 2007, R2-070463.

Panasonic, "MAC PDU format for LTE", 3GPP TSG RAN WG2 #56bis R2-070096, Jan. 2007.

Sammour et al., U.S. Appl. No. 60/863,185.

NTT Docomo et al: "MAC PD U structure for LTE", 3GPP TSG RAN WG2 #56bis, R2-070280, Jan. 2007, XP050133369.

Catt et al: "Enhancement to Buffer Status Reporting", 3GPP TSG-RAN WG2 #57bis, R2-071345, Mar. 2007, XP050134291.

LG Electronics Inc: "PDCP retransmissions" 3GPP Draft; R2-073041 PDCP RETRANSMISSIONS_V2, Aug. 16, 2007, XP050135778.

LG Electronics Inc: "Contents of PDCP Status Report R2-07xxxx", 3GPP TSG-RAN WG2, 59, Oct. 8, 2007, pp. 1-3, XP002580785.

"PDCP Structure and Traffic Path" 3GPP Draft; R2-073259, Aug. 16, 2007, XP050135985.

Asustek: "Granularity Consideration for Variable RLC PDUsizes"; R2-070336, XP050133423.

"3GPP; Technical Specification Group Raido Access Network; Medium Access control (MAC) protocol specification (Release 7)"; XP050367709.

3GPP Generation Partnership Project; 3Gpp Standard; 3Gpp TS 25.323, XP050367856.

Bosch: "Header Compression Signalling" 3GPP Draft; XP050114120.

Youjun Gao et al.: "Research on the access network and MAC technique for beyond 3G Systems" IEEEE Wireless Communications, IEEE Service Center, Piscataway, NJ, US, vol. 14, No. 2, Apr. 1, 2007, pp. 57-61, XP011184637 ISSN: 1536-1284.

3rd Generation Partnership Project: Evolved Universal Terrestrial Radio Access (E-UTRA) Medium Access Control (MAC) protocol specification (Release 8), Technical Specification Group Radio Access Network, Mar. 1, 2008, XP050377617.

XP002460800; Alcatel-Lucent: "Downlink Control Signaling and Multiplexing for VOIP, R1-071721" Jun. 26, 2007, pp. 1-4.

XP002602993; Nokia Corporation, Nokia Siemens Networks: "MAC header format, R2-073891", 3GPP TSG_RAN WG2 meeting 59bis, Oct. 1, 2007.

XP050134474; LG Electronics Inc: "Support for VoIP over MAC-hsEHS" 3GPP Draft; R2-071542, Apr. 2, 2007.

Nokia; "Requirements for redirection in E-UTRAN", 3GPP TSG-RAN WG2 Meeting #56-bis, R2-070107, Jan. 2007.

LG Electronics; "Relative Buffer Status Reporting", 3GPP TSG-RAN WG2 meeting #46bis, R2-050852, Apr. 2005.

IPWireless; "Layer 2 functions for LTE", 3GPP TSG RAN WG2 #48bis, R2-052377, Oct. 2005.

Samsung; "Selective forwarding/retransmission during HO", 3GPP TSG-RAN2 Meeting #56bish, R2-070130, Jan. 2007.

Samsung; "Re-use of PDCP SN at ARQ level?", 3GPP TSG-RAN2 Meeting #53bis, R2-061829, Jun. 2006.

Ericsson: "Initial Random Access Procedure for E-UTRAN", 3GPP TSG-RAN WG2 #55, Seoul, Korea, Oct. 9-13, 2006, R2-062853.

Samsung: "LTE Random access procedure", 3GPP TSG RAN #54, Tallinn, Estonia, Aug. 28-Sep. 2, 2006, R2-062258.

Siemens: "Initial Access Procedure", 3GPP TSG-RAN WG2 LTE Adhoc meeting, Cannes, France, Jun. 27-30, 2006, R2-061931.

IPWireless: "Contention Resolution in Non-Synchronous RACH Access", RAN2 #54, Tallinn, Estonia, Aug. 28-Sep. 1, 2006, R2-062269.

Ericsson: "MAC header for improved L2 support for high data rates", 3GPP TSG-RAN WG2 #57, St. Louis, Missouri, Feb. 12-16, 2007, R2-070810.

LG Electronics: "UL Timing Control related to Contention Resolution", 3GPP TSG-RAN WG2 #61bis, Shenzhen, China, Mar. 31-Apr. 4, 2008, R2-081607, XP050139334.

Nokia et al: "UL reporting rate for DL quality measurements in CELL_FACH", 3GPP Draft; R2-071404, vol. RAN WG2, XP050134343, Mar. 26-30, 2007, St. Julian's, Malta.

Alcatel-Lucent: "Downlink Control Signaling and Multiplexing for VOIP R1-071721", 3Nu Generation Partnership Project (3GPP) Technicalspecification Group (TSG) Radio Access Network (RAN); Workinggroup 1 (WG1), No. 48bis, Mar. 26, 2007, pp. 1-4, XP002460800.

Nokia Corporation, Nokia Siemens Networks: "MAC Header Format, R2-073891", #GPP TSG-RAN WG2 meeting 59bis, Oct. 1, 2007, XP002602993.

LG Electronics Inc.: "Support for VOIP Over MAC-hs/ehs", 3GPP Draft; R2-071542 Support for VOIP Over MAC-HS, 3rd Generation Partnership Project (3GPP), Mobile Competence Centre; vol. RAN WG2, no. St. Julian; Apr. 2, 2007, XP050134474.

Nokia: "RACH reporting", 3GPP Draft; 24A000008, 3rd Generation Partnership Project (3GPP), XP050141261, Sophia Antipolis, France.

3GPP; "Packet Data Convergence Protocol (PDCP) Specification (Release 7)", 3GPP TS 25.323, XP050367856, Mar. 1, 2007.

LG Electronics, DRX Scheme, 3GPP TSG-RAN WG2#56 R2-063248, Nov. 10, 2006.

Samsung: "DRX operations for connected mode UEs in LTE", 3GPP DRAF; R2-063120 DRX for Connected UE, 3rd Partnership Project (3GPP), XP050132629, Meeting #56, Nov. 6-10, 2006, Riga, Latvia.

Ericssion: "Enhanced Paging Procedure", 3GPP Draft; R2-070586, 3rd Generation Partnership Project (3GPP), Feb. 12-16, 2007, St. Louis, Missouri.

Ericssion: "Issues on DRX in ITE Active", 3GPP Draft; R2-070797, 3rd Generation Partnership Project (3GPP), Feb. 12-16, 2007, St. Louis, Missouri.

(56) References Cited

OTHER PUBLICATIONS

LG Electronics Inc: "PDCP retransmissions." 3GPP Draft; R2-073041 PDCP Retransmissions V2, Aug. 16, 2007, XP050135778.
NEC, Fast setup for PS services (Cell PCH & URA PCH), 3GPP TSG-RAN WG2#53 R2-061124. May 12, 2006.
ZTE: "MAC state transition Document: For Discussion", 3GPP Draft; R2-060064, 3rd Generation Partnership Project (3GPP), vol. RAN WG2, XP050130225, Jan. 5, 2006.
"Summary of email discussion on DRX control", 3GPP Draft: R2-07XXXX DRX Control LTE V6, 3rd Generation Partnership Project (3GPP), XP050602959, Mar. 23, 2007, p. 3.
Samsung, Contention resolution in a RACH, 3GPP TSG-RAN WG2#57bis R2-071386, Mar. 30, 2007.
TD Tech, Contention Resolution and Initial Random Access, 3GPP TSG-RAN WG2#57 R2-070910, Feb. 19, 2007.
IP Wireless, Initial Access Procedure and C-RNTI Allocation, 3GPP TSG-RAN WG2#56bis R2-070301, Jan. 19, 2007.
Ericssion: "Initial, Random Access and Identity Handling", 3GPP Draft; R2-060592, (3GPP), XP050130549, Feb. 9, 2006.
R2-061986, "Initial Access Procedure", LG Electronics, Jun. 27-30, 2006.
3rd Generation Partnership Project "Radio Interface Protocol Aspects" 3GPP TR 25.813, May 29, 2006.
Ericsson "DRX and DTX in LTE_Active", R2-060967, Mar. 27, 2006.
"ARQ operation and HARQ", 3GPP TSG RAN WG2#55; R2-062843, 3rd Generation Partnership (3GPP), Oct. 9, 2006, pp. 1-4.
"LTE Handover procedures, text proposal", 3GPP Draft; R2-061338 TP For TR 25813 on LTE Handover-FD, 3R ° Generation Partnership Project (3GPP), Mobile Competence Centre; 650, Route Des Lucioles; F-06921 Sophia-Antipolis Cedex; France, vol. Ran WG2, no. Shanghai, China; 20060504, May 4, 2006, XP050131278, [retrieved on May 4, 2006] "p. 1, lines 7-10, paragraph 2"; "p. 1, lines 15-16, paragraph 2"; "p. 1, lines 27-30, paragraph 2"; p. 3, lines 6-9*.
Samsung: "UL Timing Sync Procedure", Internet Citation, Mar. 27, 2006, XP002434793, Retrieved from the Internet: URL: http://www.3gDp.ocgiftp/tsg ran/WG2 RL2/TSGR2 52/Documents/ [retrieved on May 23, 2007] "p. 1, paragraph 1"; *p. 3, paragraph 2.3*; "p. 4, lines 5-6, paragraph 3" .
R2-063034, "Open issues in random access procedure", Qualcomm Europe, Oct. 91" to 131" 2006 Entirety.
LG Electronics, Multi-level DRX Operation in CELL_PCH, 3GPP TSG-RAN WG2 #58, R2-071930, May 7-11, 2007.
NEC, Fast setup for PS services (Cell PCH & URA PCH), 3GPP TSG-RAN2 Meeting #54, Tdoc R2-062328, Aug. 28, 2006-Sep. 6, 2006.
Catt, "Non-synchronized access and C-RNTI allocation", 3GPP TSG-RAN WG2 #55, Seoul, Korea, Oct. 9-13, 2006, R2-062933.
LG Electronics, "DRX Scheme", 3GPP TSG-RAN WG2 #56bis, Jan. 15-19, 2007, Sorrento, Italy, R2-070265.
Nokia, "Discontinuous reception in CELL_FACH", 3GPP TSG-RAN WG2 Meeting #58, St. Julian's, Malta, Mar. 26-30, 2007, R2-071403.
Catt, "Non-synchronized access and C-RNTI allocation", 3GPP WSG-RAN WG2, #55, Seoul, Korea, Oct. 9-13, 2006, R2-062933.
NTT DoCoMo, Inc: "E-mail discussion on U-plane ciphering location for LTE", 3GPP TSG RAN WG2 #57bis, St. Julian's, Malta, Mar. 26-30, 2007, R2-071293.
LG Electronics: "U-plane ciphering at MAC/Physical Layer", 3GPP TSG RAN WG2 #57bis, St. Julian's, Malta, Mar. 26-30, 2007, R2-071550.
LG Electronics: "Discussion on Message 4 in Random Access", 3GPP TSG-RAN WG2, #57, St. Louis, Missouri, Feb. 15-19, 2007, R2-070519.
LG Electronics: "Discussion on Message 4 in Random Access", 3GPP TSG-RAN WG2, #57bis, St. Julian's Malta, Mar. 26-30, 2007, R2-071456.
LG Electronics: "Discussion on Message 4 in Random Access", 3GPP TSG-RAN WG2, #58, Kobe, Japan, May 7-11, 2007, R2-071923.

* cited by examiner

METHODS OF TRANSMITTING DATA BLOCKS IN WIRELESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application [claims priority to] *is a reissue of, and claims the benefit of, U.S. Pat. No. 8,081,662, issued on Dec. 20, 2011, which is a 35 U.S.C. §371 National Stage Entry of* International Application No. PCT/KR2008/002468 filed on Apr. 30, 2008, which claims priority to U.S. Provisional Application No. 60/915,042 filed on Apr. 30, 2007, U.S. Provisional Application No. 60/915,417, filed May 1, 2007 and Korean Patent Application No. 10-2008-0040506, filed on Apr. 30, 2008, all of which are incorporated by reference for all purposes as if fully set forth herein.

TECHNICAL FIELD

The present invention relates to a wireless communication system, and more particularly, to a method for transmitting data blocks in a wireless communication system.

BACKGROUND ART

FIG. 1 illustrates the structure of a wireless access protocol responsible for data transmission in a radio link of a Universal Mobile Telecommunication System (UMTS) which is a third generation mobile communication system. Data link layers corresponding to the second layer (Layer 2: L2) of the Open System Interconnection (OSI) reference model include a Medium Access Control (MAC) layer, a Radio Link Control (RLC) layer, a Packet Data Convergence Protocol (PDCP) layer, and a Broadcast/Multicast Control (BMC) layer. The physical layer corresponds to the first layer (Layer 1: L1). Information exchange between protocol layers is performed through virtual access points that are referred to as "Service Access Points (SAPS)", which are represented by ovals in FIG. 1. Data units communicated between layers are given different names. These data units are referred to as "Service Data Units (SDUs)" and basic units that protocols use for transmitting data are referred to as "Protocol Data Units (PDUs)". In the following description of the invention, data delivered between layers in the wireless access protocol structure indicates data blocks in specific units such as SDUs or PDUs described above.

The MAC layer is a layer responsible for mapping between logical and transport channels. The MAC layer selects an appropriate transport channel for transmitting data received from the RLC layer and adds required control information to a header of a MAC PDU. Special functions performed by the MAC layer include a radio resource management function and a measurement function. The radio resource management function is not performed solely by the MAC layer. Instead, the radio resource management function serves to set operations of the MAC layer based on various MAC parameters received from a Radio Resource Control (RRC), which is located above the MAC layer, to control data transmission. Examples of the radio resource management function include a function to change mapping relations between logical and transport channels or to multiplex and transmit data through a scheduling function. The measurement function is to measure the amount of traffic of a terminal and to report the measurement to an upper layer. The upper layer can change the configuration (or setting) of the MAC layer based on the measurement information obtained by the MAC layer of the terminal, thereby efficiently managing radio (wireless) resources.

The RLC layer is located above the MAC layer and supports reliable data transmission. The RLC layer segments and concatenates RLC Service Data Units (SDUs) received from the above layer in order to construct data having a size suitable for a radio link. An RLC layer at the receiving side supports data recombination in order to restore original RLC SDUs from the received RLC PDUs. Each RLC entity can operate in a Transparent Mode (TM), an Unacknowledged Mode (UM), or an Acknowledged Mode (AM) according to processing and transmission methods of RLC SDUs. When the RLC entity operates in the TM, it transfers an RLC SDU received from an upper entity or layer to the MAC layer without adding any header information to the RLC SDU. When the RLC entity operates in the UM, it segments/concatenates RLC SDUs to construct RLC PDUs and adds header information including a sequence number to each RLC PDU. However, in the UM, the RLC entity does not support data retransmission. When the RLC entity operates in the AM, it can use the RLC SDU segmentation/concatenation function to construct RLC PDUs and can perform retransmission when packet transmission has failed. Various parameters and variables such as a transmission window, a reception window, a timer, and a counter are used for the retransmission function in the AM.

The PDCP layer is used only in packet exchange regions and can compress and transmit IP packet headers so as to increase the transmission efficiency of packet data in wireless channels. The PDCP layer also manages sequence numbers in order to prevent data loss during Serving RNC (SRNC) relocation.

The BMC layer broadcasts cell broadcast messages received from a core network to multiple users through a common channel.

The physical layer, which is the first layer, provides an information transfer service to an upper layer using a physical channel. The physical layer is connected to the Media Access Control (MAC) layer located above the physical layer through a transport channel. Data is transferred between the MAC layer and the physical layer through the transport channel. Data is transferred between different physical layers (specifically, physical layers of transmitting and receiving sides) through a physical channel.

A Radio Resource Control (RRC) layer, which is the third layer located at the bottom, is defined only in the control plane and is responsible for controlling logical, transport, and physical channels in association with configuration, re-configuration, and release of Radio Bearers (RBs). RBs are services that the second layer provides for data communication between terminals and a network including a base station. The control plane is a hierarchy in which control information is transferred in the vertical structure of the wireless access protocol of FIG. 1 and the user plane is a hierarchy in which user information such as data/information is transferred.

As shown in FIG. 1, an RLC PDU generated in the RLC layer is transferred to the MAC layer and is handled as a MAC SDU in the MAC layer. While a MAC SDU, which is an RLC PDU received from the RLC layer, undergoes various functions of the MAC layer, various header information required for data processing is added to the MAC SDU. The header information can be altered depending on mapping relations between logical and transport channels.

Logical channels provide transport passages required for data exchange between the MAC and the RLC layer. Each logical channel is classified into control and traffic channels according to the type of data transmitted therethrough. The control channel transmits data of the control plane and the traffic channel transmits user traffic data. A logical channel is a type of data stream carrying a specific type of information. Each logical channel is generally connected to one RLC entity. One or more logical channels of the same type can also be connected to an RLC entity. Transport channels provide passages for data communication between the physical and MAC layers. A data stream in a logical channel is embodied as a MAC PDU in the MAC layer. Reference will now be made to the MAC PDU.

FIG. 2 illustrates an example structure of a MAC PDU with a header added thereto in a mobile communication system. A MAC PDU includes one or more MAC SDUs corresponding to payload for data and a MAC header which is a set of MAC sub-headers indicating the size or type of each MAC SDU. In the example of FIG. 2, it is assumed that a total of N upper layer data blocks are provided. A MAC sub-header includes a Logical Channel ID (LCID) identifying each SDU, a length field (L) indicating the size of each SDU, and an extension field (E) indicating whether a subsequent field is a MAC header or an SDU to indicate whether or not additional headers are present.

The LCID indicates which logical channel corresponds to data of a MAC SDU which is an upper layer data block associated with a sub-header including the LCID. That is, one MAC PDU includes one or more upper layer data blocks and different logical channels can be allocated to the upper layer data blocks individually.

Generally, one or more logical channels can be established between a terminal and a base station. For example, in the case of a voice service, not only a logical channel carrying voice traffic but also a logical channel for a Signaling Radio Bearer (SRB) for control information communicated between the base station and the terminal can be established between the base station and the terminal. In this case, state changes of the SRB and state changes of the voice traffic channel may occur independently of each other. More specifically, change of an Adaptive Multi-Rate (AMR) codec mode in the voice traffic channel and generation of an urgent message in the SRB channel may occur independently of each other. Therefore, an upper layer data block for voice traffic and an upper layer data block for an SRB can both be allocated to one MAC PDU and the size or the like of each upper layer data block can be set to be different according to the type and usage of a logical channel associated with the upper layer data block. The size of each upper layer data block can be set through a size field in a MAC sub-field of a MAC SDU corresponding to the upper layer data block.

DISCLOSURE

Technical Problem

Since MAC header values, which are part of a MAC PDU (i.e., a lower layer data block) excluding MAC SDUs (i.e., upper layer data blocks) containing payload, are not actual data values as described above, it is necessary to minimize the MAC header values to increase throughput. However, the sizes or types of the fields of the MAC header are fixed and used regardless of which logical channel is associated with each MAC SDU in the MAC PDU, regardless of what are actual contents of the MAC SDU, etc. This causes a reduction in system efficiency due to overhead of control signals.

It is also necessary to allocate radio resources to the upper layer data block suitable for characteristics of the upper layer data block and to perform an operation on the upper layer data block according to urgency and importance of the processing of upper layer data block.

The present invention has been suggested to overcome the above problems in the background art, and it is an object of the present invention to provide a method for generating a data block in a communication system.

Another object of the present invention is to provide a method for generating a data block using state indication information of one or more upper layer data blocks in a communication system.

Technical Solution

In an aspect of the invention, there is provided a method for generating a data block to be transmitted from a specific layer in a transmitting side to a receiving side in a wireless communication system. This method includes receiving an upper layer data block from an upper layer, and generating a lower layer data block including at least part of the upper layer data block and state indication information indicating a state of the upper layer data block, the state indication information being selected variably according to a logical channel through which the upper layer data block is received.

In another aspect of the invention, there is provided a data block structure transmitted from a specific layer in a transmitting side to a receiving side in a wireless communication system. The data block structure includes a first field including an identifier of a logical channel through which an upper layer data block is received, a second field including state indication information indicating a state of the upper layer data block received from an upper layer, the state indication information being selected variably according to the logical channel through which the upper layer data block is received, and at least part of the upper layer data block.

Advantageous Effects

The method for generating a data block in a wireless communication system according to the invention provides the following advantages.

First, the overhead of a header of each upper layer data block is optimized according to contents of the upper layer data block and event situations associated with the upper layer data block, thereby increasing system efficiency.

Second, the receiving side of the upper layer data block can efficiently manage radio resources using the state indication information.

MODE FOR INVENTION

The above and other configurations, operations, and features of the present invention will be more easily understood from the embodiments of the invention described with reference to the accompanying drawings. The detailed description, which will be given below with reference to the accompanying drawings, is intended to explain exemplary embodiments of the present invention, rather than to show the only embodiments that can be implemented according to the invention. The embodiments described below are examples wherein the technical features of the invention are applied to an Evolved Universal Mobile Telecommunications System (E-UMTS) that is also called a "Long Term Evolution (LTE) system". It is apparent that the technical features of the invention can also be applied to other similar mobile communication systems such as IEEE 802.16m or Wibro systems.

The E-UMTS system is an evolved version of the conventional WCDMA UMTS system and a basic standardization process thereof is in progress in the 3rd Generation Partnership Project (3GPP). For details of the technical specification of UMTS and E-UMTS, see Release 7, Release 8, and Release 9 of "3rd Generation Partnership Project; Technical Specification Group Radio Access Network".

The technology described below can be used for various communication systems including a system using multiple antennas.

Communication systems are widely disposed to provide various communication services such as voice and packet data services. This technology can be used for downlink or uplink. The term "downlink" refers to communication from a base station to a terminal and "uplink" refers to communication from a terminal to a base station. The term "base station" generally refers to a fixed point that communicates with terminals and includes a network excluding terminals in a communication system including not only a physical transport end but also upper layers. Thus, in the invention, the network and base station are considered identical as they constitute the side opposite the terminals. Terminals may be fixed or mobile. The invention can be used in a single-carrier or multi-carrier communication system. The multi-carrier system can use Orthogonal Frequency Division Multiplexing (OFDM) or other multi-carrier modulation techniques.

Figure 3:
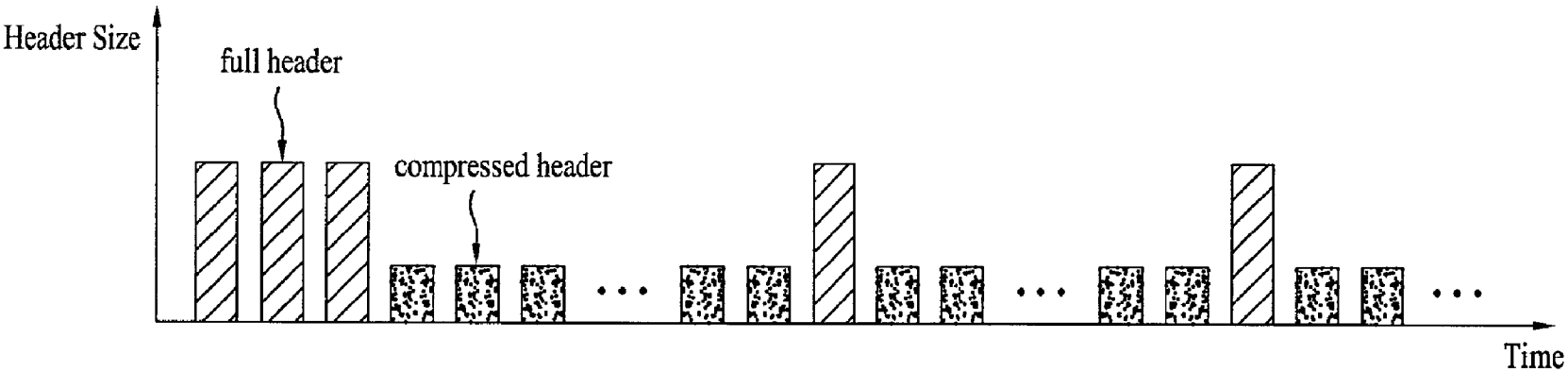
FIG. 3 illustrates a structure of a network in an E-UMTS system in the related art.

FIG. 3 illustrates a structure of a network in the E-UMTS system.

The E-UMTS network can be mainly divided into an E-UTRAN and a CN. The E-UTRAN includes terminals (or User Equipments (UEs)), base stations (or eNode Bs (eNBs)), a Serving Gateway (S-GW) located at an end of the network and connected to an external network, and a Mobility Management Entity (MME) that manages mobility of UEs. One eNB may have one or more cells. eNBs are connected to each other through an X2 interface. Each eNB is connected to UEs through a radio interface and is connected to an Evolved Packet Core (EPC) through an S1 interface.

An embodiment of the invention suggests a method for generating data blocks to be transferred to a lower layer using state indication information indicating occurrence of a specific event associated with at least one upper layer data block to be transferred to a MAC layer and the type of a logical channel associated with the at least one upper layer data block.

The specific event suggested in the embodiment of the invention indicates occurrence, change, or removal of a specific situation associated with at least one of the type and contents of a logical channel carrying the upper layer data block.

The specific event may be set for each logical channel. The logical channel may be any type of logical channel such as a channel indicating system control information, a channel carrying paging (or call) information of a terminal, a channel for dedicated control information between a terminal and a base station, a channel for common control information, a channel for dedicated traffic for a specific terminal, and a channel for common traffic.

State indication information suggested in an embodiment of the invention indicates the occurrence or nonoccurrence of the specific event associated with a logical channel identified by an identifier of an upper layer data block included in a MAC header. More specifically, the MAC layer can receive an LCID that serves as an identifier of an upper layer data block for the same type of service from an upper layer and can determine which logical channel corresponds to the upper layer data block and can receive, from the upper layer, information indicating whether or not a specific situation associated with the logical channel has occurred or can determine the size or the like of radio resources required by the MAC layer to determine the value of the state indication information.

The state indication information may be one or more bits long. The number of bits of the state indication information is determined according to the number of specific events associated with the logical channel identified by the LCID. More specifically, 1 bit suffices for the state indication information if the number of specific events associated with the logical channel is 2 and 2 bits suffice if the number of specific events is 4. The number of bits of the state indication information can be changed according to the system operating mode.

A specific event for setting the state indication information suggested in an embodiment of the invention is an occasion where the upper layer data block is a voice data block. This informs the MAC layer or the receiving side of facts such as the fact that real-time processing is required and a relatively low amount of radio resources suffices compared to when the upper layer data block associated with the specific logical channel is a non-voice data block. This enables appropriate radio resource allocation.

A specific event for setting the state indication information suggested in another embodiment of the invention is an occasion where the upper layer data block is a silent data block. This increases the efficiency of resource management in a system that allocates radio resources in units of milliseconds or tens of milliseconds (possibly, in other units smaller than milliseconds or greater than tens of milliseconds) since the minimum amount of radio resources for maintaining call connection is required in the case where the upper layer data block is a silent data block.

A specific event for setting the state indication information suggested in another embodiment of the invention is an occasion where the upper layer data block is an RRC control message data block. Examples of the RRC control message include system information and RRC connection request, establishment, and release-related messages. The MAC layer or receiving side determines the priority of processing of the upper layer data block and the amount of radio resources required for the upper layer data block according to the type of the RRC control message.

A specific event for setting the state indication information suggested in another embodiment of the invention is an occasion where the upper layer data block is a Non Access Stratum (NAS) control message data block. The MAC layer or receiving side determines the priority of processing of the upper layer data block and the amount of radio resources required for the upper layer data block according to the system operating mode since the NAS control message includes protocols associated with signaling between UEs and a core network.

A specific event for setting the state indication information suggested in another embodiment of the invention is an occasion where the upper layer data block is associated with a full header data block or a compressed header data block. As described above, the PDCP layer located above the MAC layer compresses header information of an IP-based data stream such as Transmission Control Protocol (TCP)/Internet Protocol (IP) or Routing Table Protocol (RTP)/User Datagram Protocol (UDP)/IP to increase data transmission efficiency. More specifically, header compression is performed to increase transmission efficiency of IP packet data which is a data block in a wireless channel since the size of a header of an IP packet used in a wired network covers a significant proportion of the overall size of the IP packet. Header compression is based on the fact that each of the headers of packets belonging to the same packet stream has a large constant portion. Header compression is a method for reducing the overhead of headers by storing constant fields in context format in both a compressor of the transmitting side and a decompressor of the receiving side and then transmitting only changed fields after the context is created.

A PDCP entity of the transmitting side receives a PDCP SDU from an upper layer and compresses header information of the corresponding packet using a unique header compression scheme to construct a PDCP PDU and then transfers the PDCP PDU to the RLC layer.

Figure 4:
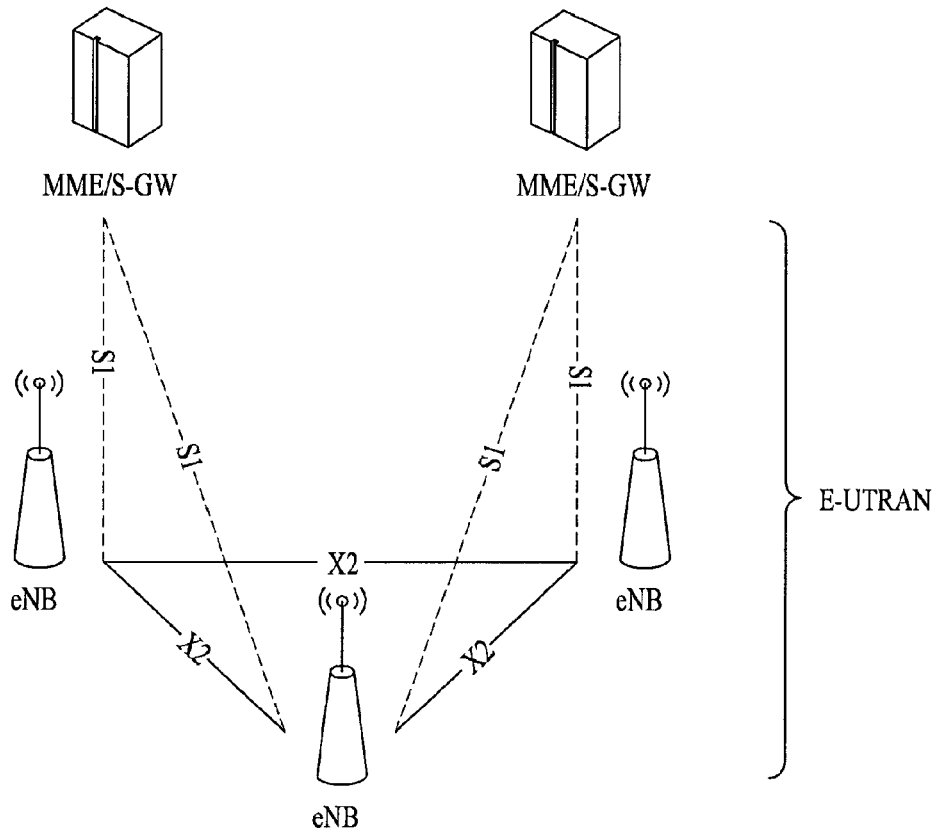
FIG. 4 illustrates example transmission of a full header packet and a compressed header packet when a conventional header compression scheme is employed.

FIG. 4 illustrates example transmission of a full header packet and a compressed header packet when a conventional header compression scheme is employed. In the following description, packets associated with header compression indicate IP-based data packets such as TCP/IP packets.

At an initial stage of header compression of a packet stream, header compression provides no benefit since the compressor transmits a full header packet to form context of the packet stream. However, after context is created, header compression provides significant benefits since the compressor transmits only compressed header packets. Which packet is to be transmitted with a full header and which packet is to be transmitted with a compressed header is determined solely by the compressor. Generally, a full header packet is transmitted when context of a packet stream is initially created and, thereafter, a full header packet is transmitted each time a predetermined time elapses while compressed header packets are transmitted so that context of the decompressor is synchronized with context of the compressor.

Upon receiving a packet from an upper layer, a PDCP compressor in a transmitting side transmits the packet together with a full or compressed header to a receiving side according to the pattern of the header of the packet. The compressor transmits the packet as a full header packet if it determines that it is necessary to create new context or update context and transmits the packet as a compressed header packet if it determines that context of the header pattern of the packet has already been created in the decompressor.

The PDCP decompressor in the receiving side needs to receive a full header packet of a packet stream to create corresponding context because the context is a basis for recovering compressed headers that will be received afterwards. If the decompressor receives a compressed header packet before context has been created, the compressor discards the received packet since it cannot reconstruct the original header of the packet.

More specifically, when a header compression scheme is used for a PS service in a radio link, the transmitting-side PDCP transmits each packet, received in a stream having the same Quality of Service (QoS) from an upper layer, as one of a packet that serves to create or update context or a packet that does not serve to create or update context. The packet that serves to create or update context can be considered much more important than the packet that does not serve to create or update context since all packets that are not to create or update context, subsequent to a packet that serves to create or update context, will be discarded without being decompressed at the receiving side if the packet that serves to create or update context has not been successfully received by the receiving side.

Therefore, the MAC layer or the receiving side is previously informed whether or not a header of an upper layer data block associated with a common or dedicated traffic channel has been compressed, thereby allowing the MAC layer or the receiving side to determine the priority of processing of the upper layer data block, the importance of the processing, the amount of radio resources that should be secured, and the like.

Table 1 illustrates an example where an LCID serving as an identifier of an upper layer data block indicates a logical channel associated with a dedicated or common traffic channel and a 2-bit state indication information indicates whether or not compression of a header has occurred as an event associated with the logical channel according to another embodiment of the invention.

TABLE 1

| STATE INDICATION INFORMATION (2 BITS) | HEADER OF CURRENT OR NEXT UPPER LAYER DATA BLOCK |
|---|---|
| 0b00 | currently transmitted upper layer data block has full header |
| 0b01 | currently transmitted upper layer data block has compressed header |
| 0b10 | next upper layer data block for transmission has full header |
| 0b11 | next upper layer data block for transmission has compressed header |

A specific event for setting the state indication information suggested in another embodiment of the invention is an occasion where an AMR codec mode has been changed in an upper entity associated with the state indication information.

The AMR codec used in voice communication has one or more modes which are classified according to the size of voice information data. For example, a 136-bit upper layer data block (MAC SDU) is transferred to the MAC layer every 20 ms in a narrow-band AMR 4.75 kbps mode and a 288-bit upper layer data block (MAC SDU) is transferred to the MAC layer every 20 ms in a narrow-band AMR 12.65 kbps mode. That is, when the voice AMR code operates in one mode, the AMR codec entity generates voice information of a specific size at specific time intervals. Therefore, the size of a voice information packet transferred from the upper layer to the MAC layer is constant unless the AMR codec mode is changed. Generally, a base station or a terminal selects an AMR codec mode for use taking into consideration the amount of radio resources available in a corresponding cell, the amount of transmitted data agreed between the terminal and the base station, or the state of load in the cell. The selected AMR codec mode can be reset according to the state of the cell. Accordingly, both the base station and the terminal need to be able to cope with changes of the AMR code mode.

Voice information generated through the AMR codec (i.e., voice codec) used for voice communication has special characteristics. Voice data has two patterns, one being a talk spurt period during which somebody speaks and the other being a silent period during which nobody speaks. A voice data block containing voice information is generated every 20 ms in the talk spurt period and a silent data block containing voice information is generated every 160 ms in the silent period.

When the generated voice information corresponds to the talk spurt period, the base station will set radio resources according to the characteristics of the talk spurt period in order to efficiently use radio resources. More specifically, the base station will set radio resource information allocated to the terminal at intervals of 20 ms in consideration of the fact that a voice data block is generated every 20 ms.

In this case, if the state of the terminal is changed from the talk spurt period to the silent period, a large portion of the radio resources allocated at intervals of 20 ms will not be used since the silent data block is generated every 160 ms. Accordingly, the base station needs to immediately detect that the state of the terminal has been changed to the silent period and to immediately reset radio resources, thereby preventing waste of radio resources.

Similarly, one can consider that the base station sets scheduling resources to allow the terminal to use radio resources at intervals of 160 ms according to the silent period. In this case, if the state of the terminal is changed from the silent period to the talk spurt period, voice information transmission is delayed since the amount of resources allocated to the terminal is small although the amount of voice information to be transmitted from the terminal is large. In this case, the base station also needs to immediately reset radio resource allocation information.

Therefore, state indication information suggested in another embodiment of the invention indicates whether or not a change has been made in the voice AMR codec mode or whether or not a change has been made between the talk spurt period and the silent period.

Table 2 illustrates an example of 2-bit state indication information for an event indicating whether or not a change has been made in the AMR codec mode or whether or not a change has been made between the talk spurt period and the silent period during AMR-based voice communication using a dedicated or common traffic channel according to another embodiment of the invention.

TABLE 2

| STATE INDICATION INFORMATION (2 BITS) | HEADER OF CURRENT OR NEXT UPPER LAYER DATA BLOCK |
|---|---|
| 0b00 | no change |
| 0b01 | AMR codec mode is changed |
| 0b10 | Change is made from silent period to talk spurt period |
| 0b11 | Change is made from talk spurt period to silent period |

In Table 2, an example change of the AMR codec mode is a change between a narrow-band AMR 4.75 kbps mode and a narrow-band AMR 12.65 kbps mode.

A specific event for setting the state indication information suggested in another embodiment of the invention is an occasion where an upper layer data block associated with the state indication information is an urgent control message or a non-urgent control message.

Control information communicated through a Signaling Radio Bearer (SRB) for control of configuration (or setup) between a base station and a terminal can be classified into relatively urgent control information and relatively non-urgent control information. An example of the urgent control information is control information associated with a handover command received from the base station when a terminal moves between cells, and an example of the relatively non-urgent control message is control information that the base station uses to notify one or more terminals of broadcast service channel information.

In this case, when a logical channel indicated by an identifier of an upper layer data block is a channel carrying system information such as a Broadcast Control CHannel (BCCH), 1-bit state indication information can be used to indicate whether the upper layer data block that is being currently processed or will be processed next is an urgent message.

Information regarding a specific event for setting the state indication information suggested in another embodiment of the invention can be provided to each terminal through system information or traffic information communicated between the base station and the terminal. More specifically, during RB configuration or re-configuration, the base station notifies, through an RRC configuration message, the terminal of specific events that the terminal needs to check for a specific logical channel and of relations between the events and respective state indication information values, thereby allowing the terminal to perform transmission according to the notification.

Although the upper layer data block is a MAC SDU and a data block transferred to a lower layer is a MAC PDU in the above embodiments of the invention, the invention is not necessarily applied to SDUs and PDUs of the MAC layer and may be applied to SDUs and PDUs of any other layer in which the above functions can be implemented or are needed.

Figure 5:
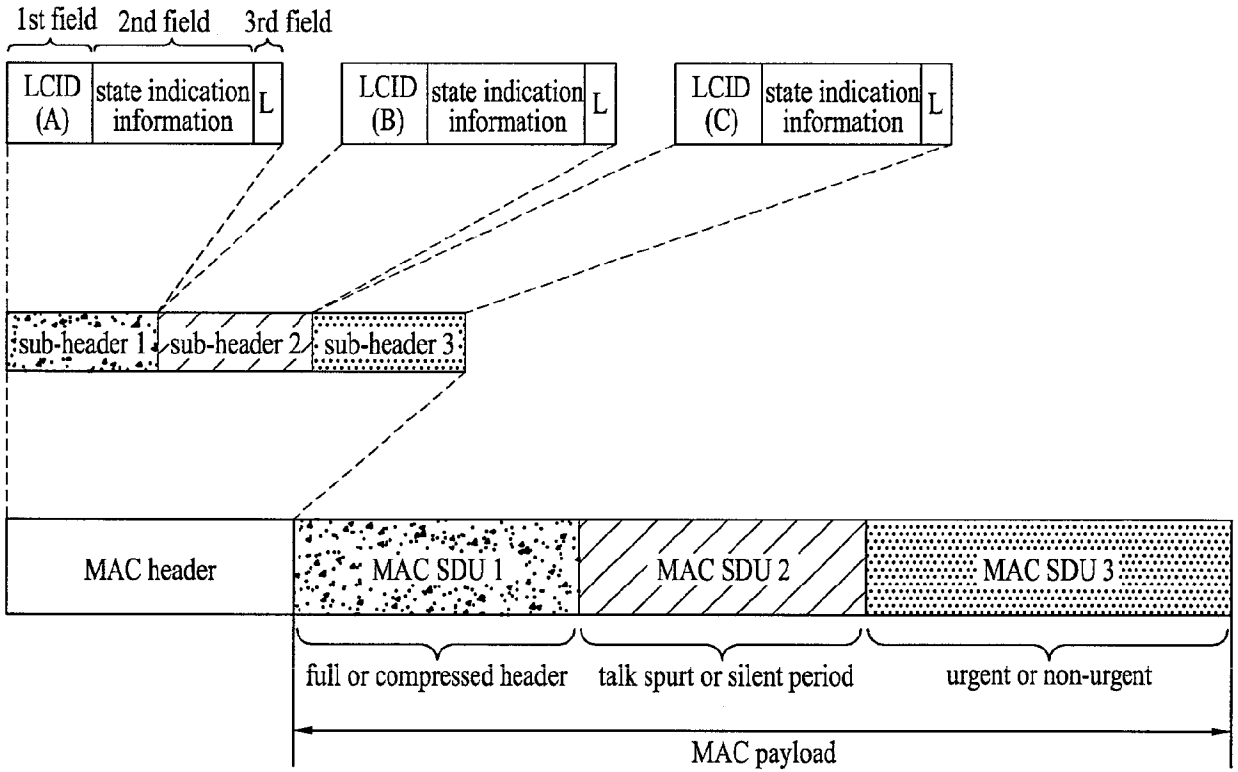
FIG. 5 illustrates a MAC PDU including at least one state indication information suggested in another embodiment of the invention.

FIG. 5 illustrates a structure of a MAC PDU including at least one state indication information suggested in another embodiment of the invention.

A sub-header of each upper layer data block includes a first field including an LCID as an identifier of a logical channel through which the upper layer data block is received, a second field including state indication information indicating the state of the upper layer data block, the state indication information being selected variably according to the logical channel through which the upper layer data block is received, and a third field including information indicating the size of the upper layer data block. The order of arrangement of the first to third fields shown in FIG. 5 can be changed according to system situations.

FIG. 5 illustrates example usage of state indication information having one bit indicating an event associated with each upper layer data block in a MAC PDU having three upper layer data blocks carrying 3 different logical channels.

The first upper layer data block is a TCP/IP packet and uses state indication information indicating whether or not header compression has been applied.

A logical channel capable of carrying a TCP/IP packet such as a Dedicated Traffic CHannel (DTCH) or a Common Traffic Channel (CTCH) can be indicated by an LCID of "A". Here, "A" represents a specific binary value.

That is, when the LCID is "A", the upper layer data block is a TCP/IP packet and an event associated with the upper layer data block includes an event regarding whether a header of the TCP/IP packet is a full header or a compressed header.

The state indication information in the first sub-head indicates a "full header" when the value of the state indication information is "1" and indicates a "compressed header" when the value of the state indication information is "0". Alternatively, the state indication information in the first sub-head can be set to indicate a "full header" when the value of the state indication information is "0" and to indicate a "compressed header" when the value of the state indication information is "1".

When a receiving side receives an upper layer data block whose LCID is "A", the receiving side checks state indication information to determine whether the received upper layer data block is a full header or a compressed header and allocates radio resources according to the determination to the upper layer data block or requests that the transmitting side allocate radio resources according to the determination to the upper layer data block.

The second upper layer data block is a VoIP packet and uses state indication information for discriminating between a talk spurt period and a silent period.

The upper layer data block to which VoIP is applied uses an LCID of "B" which can indicate a logical channel capable of carrying a VoIP packet. Here, "B" represents a specific binary value.

More specifically, when the LCID in the second sub-head is "B", the state indication information in the second sub-head indicates a "talk spurt period" if the value of the state indication information is "1" and indicates a "silent period" if the value of the state indication information is "0". Alternatively, the state indication information in the second sub-head can be set to indicate a "talk spurt period" when the value of the state indication information is "0" and to indicate a "silent period" when the value of the state indication information is "1".

When a receiving side receives an upper layer data block with an LCID of "B" and a state indication information value of "1", the receiving side determines that the upper layer data block corresponds to a talk spurt period and allocates radio resources according to the talk spurt period to the upper layer data block or requests that the transmitting side allocate radio resources according to the talk spurt period.

When the state indication information value is "0", the receiving side determines that the upper layer data block corresponds to a silent period and allocates radio resources according to the silent period or requests that the transmitting side allocate radio resources according to the silent period.

In the case of VoIP services, a talk spurt period and a silent period are defined as described above. Thus, if the current state indication information is different from state indication information of a previous transmission period, the receiving side may previously perform or request allocation of radio resources corresponding to the specific talk spurt period or the specific silent period.

The third upper layer data block relates to specific control information. Control information transmitted through a Signaling Radio Bearer (SRB) for control of configuration (or setup) between a base station and a terminal or the like can be classified into relatively urgent control information such as a handover command and relatively non-urgent control information such as broadcast service channel information as described above.

Thus, in the case of an upper layer data block using a logical channel such as a BCCH, a PCCH, a DCCH, or a CCCH, it is possible to determine, through state indication information, whether or not generation of urgent control information or non-urgent control information has occurred as an event associated with the upper layer data block. In this embodiment, the state indication information indicates an urgent message if the value of the state indication information is "1" and indicates a non-urgent message if the value of the state indication information is "0". Alternatively, the state indication information can be set to indicate an urgent message if the value of the state indication information is "0" and to indicate a non-urgent message if the value of the state indication information is "1".

When a receiving side receives an upper layer data block with an LCID of "C" and a state indication information value of "1", the receiving side determines that the upper layer data block corresponds to an urgent message and allocates radio resources according to the urgent message to the upper layer data block or requests that the transmitting side allocate radio resources according to the urgent message. The receiving side may perform or request processing of the upper layer data block by priority since the upper layer data block is an urgent message and may perform or request processing of the upper layer data block stronger at a physical stage since the upper layer data block is important information.

Table 3 illustrates LCIDs and state indication information values of events associated with the LCIDs according to the above embodiment of FIG. 5 in the case where 1-bit state indication information is used as described above.

TABLE 3

| LCID | state indication information = 1 | state indication information = 0 |
|---|---|---|
| A | full header | compressed header |
| B | talk spurt period | silent period |
| C | urgent | non-urgent |

Although the state indication information in this embodiment indicates state indication information associated with an event of an upper layer data block that is being currently processed, it may serve as control information in a specific transmission period, for example, control information after or corresponding to a specific number of Transmission Time Intervals (TTIs), each of which is a basic transmission interval of a specific transport channel in the MAC layer.

Figure 6:
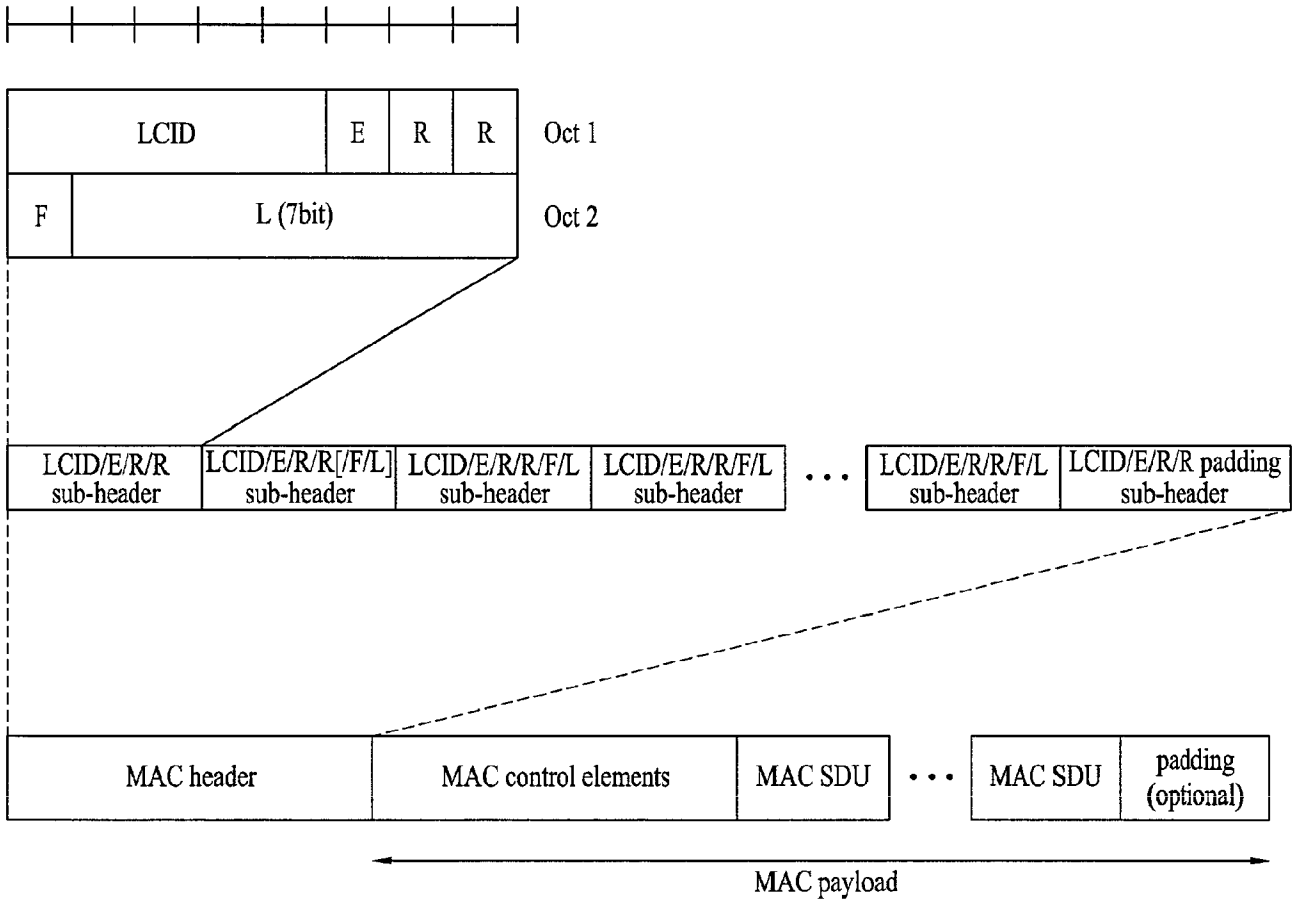
FIG. 6 illustrates an example structure of a MAC PDU in an E-UMTS suggested in another embodiment of the invention.

FIG. 6 illustrates a MAC header of an E-UMTS suggested in another embodiment of the invention.

Figure 1:
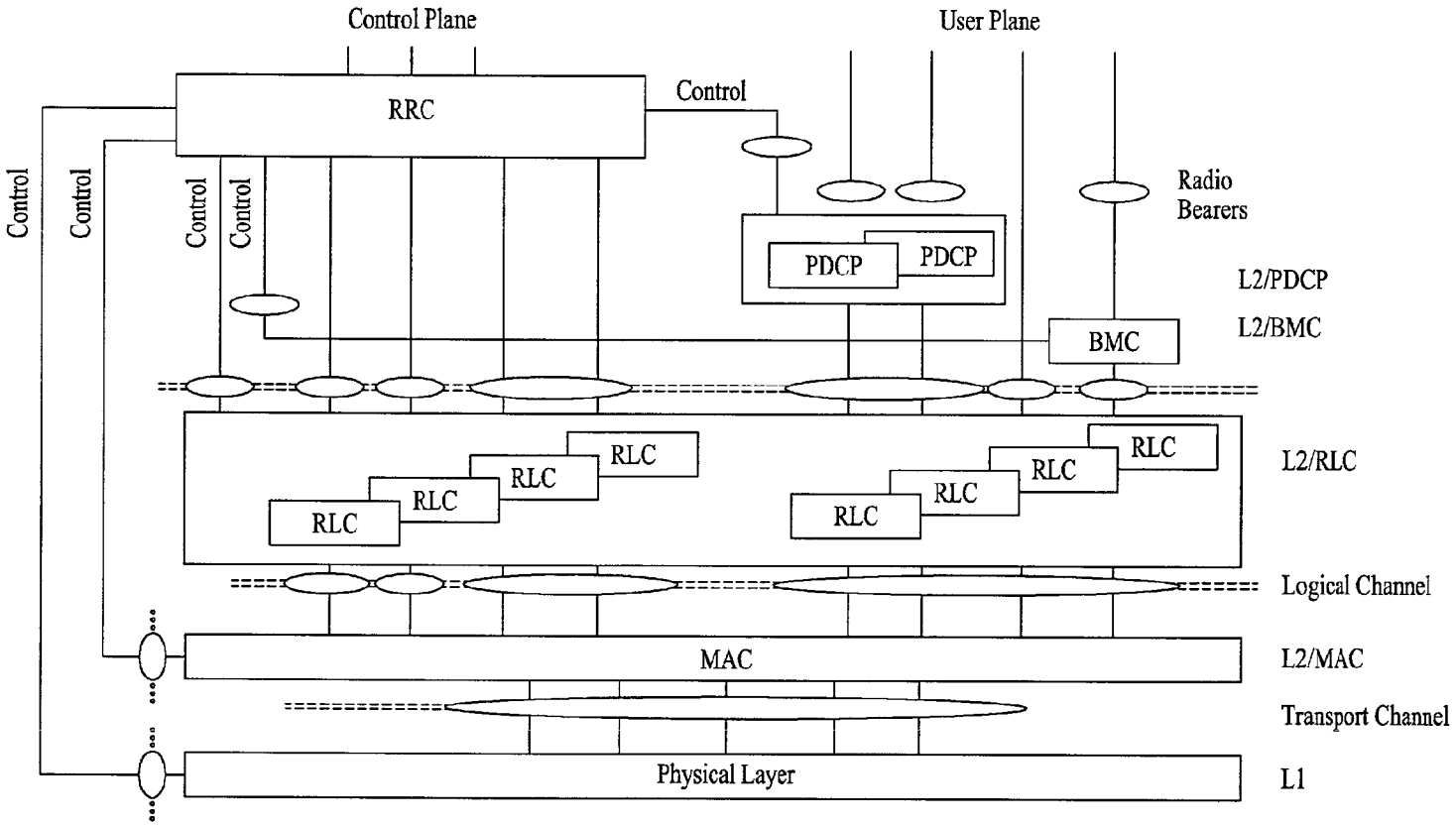
FIG. 1 PRIOR ART
FIG. 1 illustrates the structure of a wireless access protocol responsible for data transmission in a radio link of a Universal Mobile Telecommunication System (UMTS) which is a third generation mobile communication system.
Figure 2:
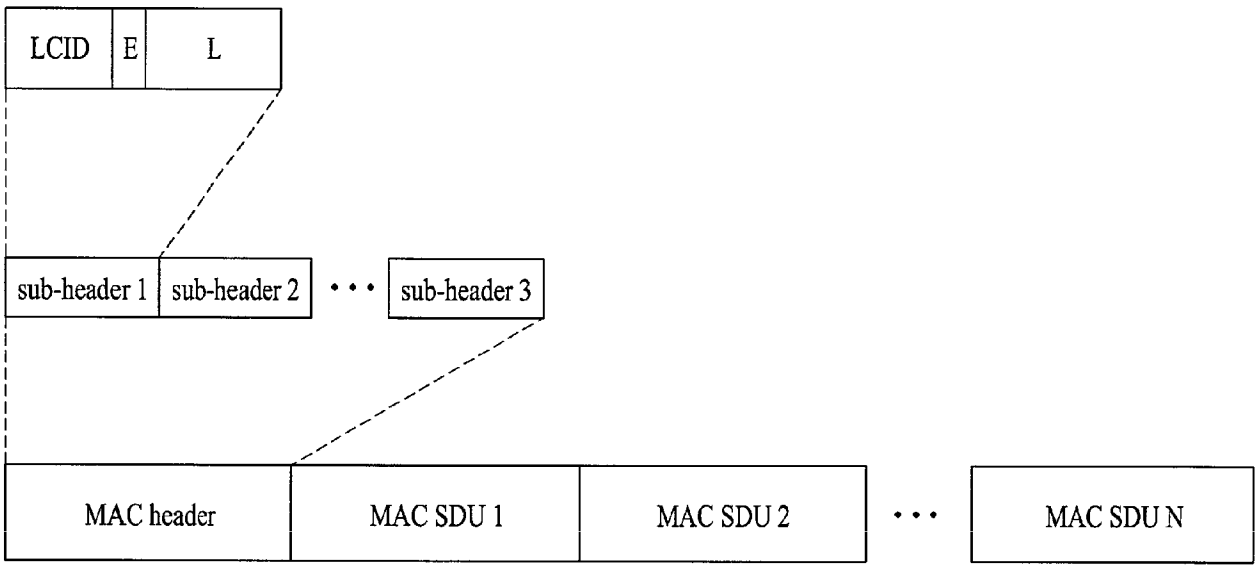
FIG. 2 PRIOR ART
FIG. 2 illustrates an example structure of a MAC PDU with a header added thereto in a mobile communication system.

A sub-head of a MAC PDU of the E-UMTS includes a 5-bit LCID field, a 1-bit E field, a 2-bit R field, a 1-bit F field, and a 7-bit (possibly, 15-bit) L field. In this embodiment, a MAC PDU includes a total of N upper layer data blocks. Therefore, a header of a MAC PDU also includes a total of N MAC PDU sub-heads. Details of the LCID field, the E field, the R field, and the L field are described above with reference to FIG. 2. In this embodiment of the invention shown in FIG. 6, one bit of the 2-bit R field is used as state indication information.

Unlike sub-heads of general MAC PDUs, the sub-header of this embodiment includes a format field F indicating the size of the length field. MAC control elements may include a Buffer Status Reporting (BSR) control element, a C-RNTI control element, a DRX command control element, and the like. The BSR provides information regarding the amount of data in an uplink buffer. The SSR control element provides information regarding the size of the buffer. The C-RNTI control element represents identification information of a new terminal which has entered a cell in a control RNC. The MAC control elements may also include other control elements as needed.

Each MAC PDU is generally processed in bytes. Therefore, when a total length of a combination of a MAC header, control elements, and MAC SDUs is not in bytes, a padding field is added to give a dummy value to the combination so that the total length is in bytes.

While the above embodiments of the present invention have been described focusing on the data communication relationship between transmitting and receiving sides for ease of explanation, the transmitting side may be a terminal or a base station in a network and the receiving side may be a base station in a network or a terminal. The terms used in the present disclosure can be replaced with other terms having the same meanings. For example, the term "terminal" may be replaced with another term such as "mobile station", "mobile terminal", "communication terminal", "user equipment (UE)", or "user device" and the term "base station" may be replaced with another term such as "fixed station", "Node B (NB)", or "eNode B (eNB)".

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be applied to a wireless communication system, and more particularly to a method for generating data blocks in a wireless communication system.

The invention claimed is:

1. A method for generating a data block at a medium access control, MAC, layer of a transmitting side in a wireless communication system, the method comprising:

receiving an upper layer data block from an upper layer; and generating the data block including a MAC header and a MAC payload, wherein the MAC payload comprises at least part of the upper layer data block and the MAC header comprises one or more sub-headers, wherein each of the one or more sub-headers comprises:

a LCID (logical channel identifier) field being used to indicate an identifier of a logical channel through which the upper layer data block is received, a 1-bit state indication information field being used to indicate a state of the upper layer data block, wherein the 1-bit value of the state indication information field is interpreted differently according to a value of the LCID field, and a L (length) field being used to indicate a size of the at least part of the upper layer data block, wherein the state indication information field in one of the one or more sub-headers indicates whether the upper layer data block includes a full header or a compressed header when the LCID field in the same sub-header indicates the upper layer data block is received through [a] *the* logical channel related with an IP packet *of the upper layer*.

2. The method according to claim 1, wherein the state indication information field in one of the one or more sub-headers further indicates whether the upper layer data block has been generated in a talk spurt period or a silent period when the LCID field in the same sub-header indicates the upper layer data block is received through a logical channel related with a voice packet.

3. The method according to claim 1, wherein the state indication information field in one of the one or more sub-headers further indicates whether the upper layer data block is urgent information or non-urgent information when the LCID field in the same sub-header indicates the upper layer data block is received through a logical channel related with predetermined control information.

4. The method according to claim 1, wherein the state indication information field is included in a MAC sub-header corresponding to the upper layer data block.

* * * * *